Patented Mar. 2, 1948

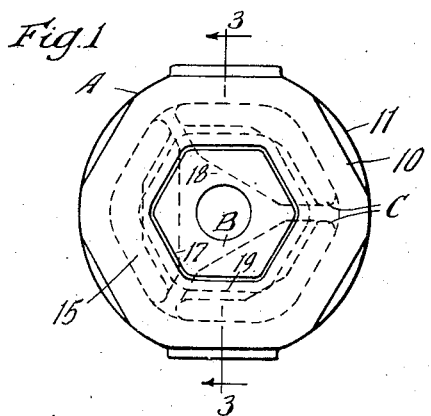
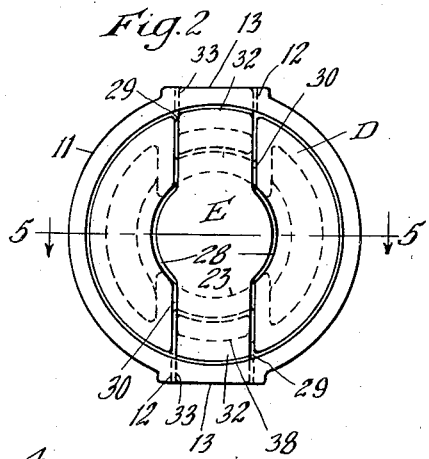
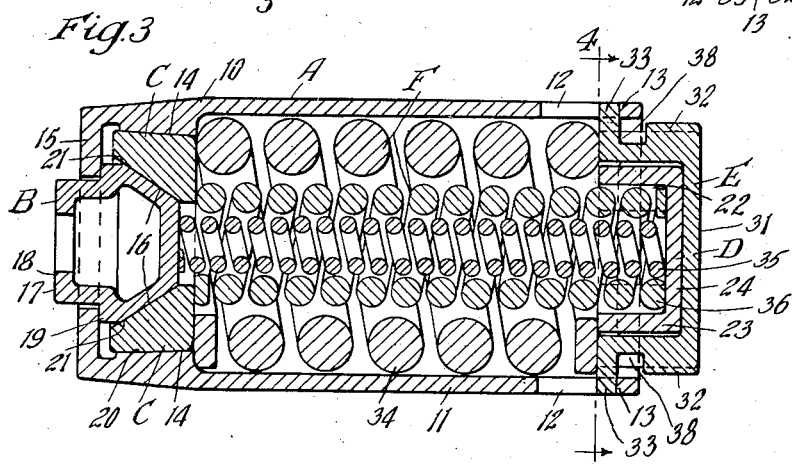
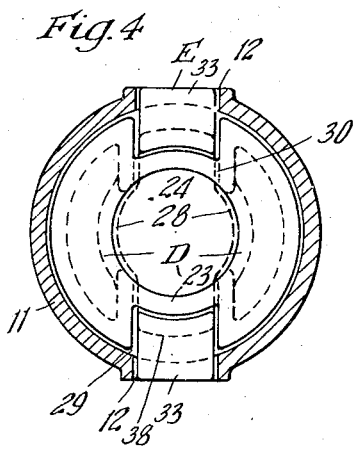
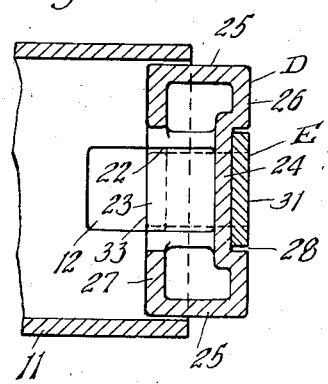

2,436,917

UNITED STATES PATENT OFFICE 2,436,917

FRICTION SHOCK ABSORBER FOR RAILWAY DRAFT RIGGINGS

George E. Dath, Mokena, Ill., assignor to W. H. Miner, Inc., Chicago, Ill., a corporation of Delaware Application October 18, 1944, Serial No. 559,156

4 Claims. (Cl. 213—34)

This invention relates to improvements in friction shock absorbers for railway draft riggings especially adapted for railway cars.

One object of the invention is to provide a friction shock absorber for railway draft riggings, comprising a friction casing having a friction shell section at one end thereof and a cylindrical spring cage section rearwardly of the friction shell provided with retaining shoulders; a friction clutch within the friction shell section, including a wedge and friction shoes, the wedge having shouldered engagement with the casing to limit outward movement of the wedge; a spring resistance within the spring cage section of the casing; a spring cap telescoped within the rear end of the spring cage; and a detachable retainer for the spring cap having shouldered engagement with the shoulders of the casing and bearing on the cap to limit outward movement of the latter.

A further object of the invention is to provide a mechanism as set forth in the preceding paragraph, wherein the retainer and cap are held interlocked by the spring resistance of the mechanism to prevent relative lateral displacement of the retainer with respect to the cap, thereby maintaining the former in position to engage the shoulders of the casing.

A more specific object of the invention is to provide in a shock absorber comprising a casing, a preliminary spring cap slidable within the casing and having its inward movement opposed by spring means within the casing, and a retainer for the spring cap having radial lugs slidably engaged in lengthwise extending, diametrically opposed openings in the casing walls, wherein the openings of the casing walls are closed at their outer ends to provide shoulders for limiting outward movement of the retainer, and the retainer bears on the rear side of the cap to limit outward movement of the latter, and wherein the parts are so proportioned that the retainer may be assembled and interlocked with the casing by entering the former while tilted through the rear end of the latter so that the lugs of the retainer will pass freely into the casing and said lugs will project into the openings of the casing in position to engage the shoulders of the latter when the retainer is righted.

Other objects of the invention will more clearly appear from the description and claims hereinafter following.

In the drawing forming a part of this specification, Figure 1 is a front elevational view of a friction shock absorber embodying my invention. Figure 2 is a rear elevational view of said friction shock absorber. Figure 3 is a longitudinal vertical sectional view, corresponding substantially to the line 3—3 of Figure 1. Figure 4 is a transverse vertical sectional view, corresponding to the line 4—4 of Figure 3. Figure 5 is a horizontal, longitudinal sectional view of the rear end portion of the mechanism shown in Figure 3, corresponding substantially to the line 5—5 of Figure 2, the spring means of the shock absorber being omitted in Figure 5.

My improved friction shock absorber, as illustrated in the drawing, comprises broadly a friction casing A; a wedge block B; three friction shoes C—C—C; a preliminary spring cap D; a retainer E for the spring cap; and a spring resistance F.

The casing A is in the form of a tubular casting having a friction shell section 10 at the forward end and a spring cage section 11 rearwardly thereof. The spring cage section 11 is preferably of cylindrical cross section and has longitudinally extending openings 12—12 through the side walls thereof. The openings 12—12 are at diametrically opposite sides of the casing and in transverse alignment. Each opening 12 is of rectangular outline and, in effect, forms a guide slot extending lengthwise of the casing. The transverse rear end walls of the openings 12—12 provide transversely aligned stop shoulders 13—13 for limiting outward movement of the retainer E.

The friction shell section of the casing is of hexagonal, transverse cross section, presenting six inwardly converging friction surfaces 14. As shown in Figure 3, the walls of the shell are thickened at the friction surfaces 14, said friction surfaces being spaced inwardly from the front end of the casing. At the forward end thereof, the friction shell section of the casing is provided with a continuous inturned stop flange 15.

The wedge B is in the form of a hollow block having three inwardly converging, flat wedge faces 16 at the inner end thereof arranged symmetrically about the longitudinal central axis of the mechanism. At the outer end, the wedge is reduced in size, said reduced portion being in the form of a hexagonal projection 17 extending through the opening defined by the flange 15 of the casing. The projection 17 protrudes from the casing, as shown in Figure 3, and has a flat, transverse, outer end face 18 adapted to receive the actuating force. The reduced portion of the wedge provides a lateral shoulder 19 at the inner end of the projection adapted to engage in back of the flange 15 of the casing to limit outward movement of the wedge.

The shoes C, which are three in number, are arranged between the wedge faces of the block B and the friction surfaces of the casing. Each shoe has an outer friction surface 20 of V-shaped, transverse cross section, cooperating with two adjacent friction surfaces 14—14 of the friction shell section 10 of the casing. Each shoe has a wedge face 21, correspondingly inclined to and engaging one of the wedge faces 16 of the wedge. At the rear end, each shoe has a flat, transverse face forming an abutment for the spring resistance F.

The spring cap D is in the form of a relatively thick, hollow, disclike member having an inwardly opening pocket 22 of cylindrical shape provided with opposed curved side walls 23—23 and a vertical outer end wall 24. The disclike cap has a cylindrical outer wall 25 and vertical outer and inner walls 26 and 27, the outer wall 26 forming a continuation of the wall 24 of the pocket 22, the wall 24 being inwardly offset with respect to the wall 26. The wall 26 provides a flat abutment surface adapted to bear on the usual rear follower of the draft rigging. The inner wall 27 connects the cylindrical wall 25 and the opposed side walls 23—23 of the pocket 22 and is provided with a central opening 28 of circular outline, forming a continuation of the pocket. The spring cap D is cut out at diametrically opposite sides to provide longitudinally extending openings 29—29 adapted to accommodate opposite side portions of the retainer E, as hereinafter described. At the outer side of the cap, diametrical slots or seats 30—30 are formed by inwardly offset portions of the wall 26. These slots or seats form continuations of the depression formed by the offset wall 24 and extend outwardly to the openings 29—29.

The retainer E is in the form of a U-shaped element comprising a transverse, barlike section 31 and relatively thick arms 32—32 at opposite ends thereof, projecting at right angles to the bar. As shown in Figures 2 and 3, the bar section 31 is seated in the depressed central portion and the slots 30—30 of the cap D, and, as shown in Figure 3, the arms 32—32 extend inwardly through the openings 29—29 of the cap. At the extremities of the arms 32—32, outturned lugs 33—33 are provided which are engaged in the openings 12—12 of the casing A and are adapted to shoulder against the stop walls or shoulders 13—13 of said openings to limit outward movement of the retainer E. The lugs 33—33 are undercut by slotting the arms, as indicated at 38—38, to facilitate assembly of the retainer with the casing A, the slots 38—38 being of sufficient width to accommodate the projecting portions of the casing A rearwardly of the openings 29—29 so that the retainer may be laterally displaced to one side a sufficient distance to enable engagement of the lugs 33—33 with the corresponding openings 29—29 of the casing. As will be evident, the arms 32—32 of the retainer embrace the cap D at opposite sides and the outer end of the cap is seated against the transverse barlike section 31 of the retainer, the latter being thus held centered and positively limited in its outward movement.

The spring resistance F preferably comprises three coils, a relatively heavy outer coil 34 having its rear end bearing on the inner side of the spring cap and the arms 32—32 of the retainer E and its front end bearing on the inner ends of the shoes C, a central coil 35 bearing at its front end on the inner end of the wedge B, and a coil 36 between the coils 35 and 34, that is, surrounding the coil 35, bearing at its front end on the shoes C—C—C. The rear ends of the coils 35 and 36 extend through the opening 28 of the cap D and into the pocket 22 thereof and bear on the end wall 26. The springs 34, 35, and 36 are under initial compression and thus hold the cap seated against the retainer E and the lugs 33 of the retainer seated against the stop shoulders 13—13 of the casing A.

In assembling the mechanism, the wedge B, shoes C—C—C, and spring F are inserted within the casing A, through the open rear end thereof. The front end of the friction casing is buttressed against a support with the wedge free so that it remains in the projected position shown in Figure 3. The cap D is then applied, the same being first axially aligned with the casing and turned to a position with the openings 29—29 respectively at the sides of the casing where the openings 12—12 are provided. While in this position the cap is pushed into the casing against the resistance of the springs 34, 35, and 36, being moved inwardly to such an extent that it will clear the retainer element while being inserted. The retainer E is then applied while tilted so that the lug at one side thereof will pass freely into the casing. Then the retainer is displaced laterally to enter this lug within the cooperating opening 12 of the casing, being moved laterally to such an extent that the lug 33 at the opposite side of the retainer will clear the corresponding side wall portion of the casing. The last named lug is then brought into registration with the cooperating opening of the casing by righting the retainer and engaging the lug within its opening by moving the retainer to centered position. The pressure is then removed from the cap, permitting the springs to project the same outwardly, thereby seating the same in the retainer E and shouldering the lugs of the latter against the walls 13—13 of the openings 12—12 of the casing. The cap is thus operatively connected to the casing by the retainer E and has its outward movement limited by the latter.

As is well known to those skilled in this art, my improved shock absorber is mounted on the railway car between the usual front and rear followers and is compressed therebetween during both draft and buffing actions. In the operation of my improved mechanism as the same is being compressed, the preliminary spring cap D is first forced inwardly against the spring resistance, the friction existing between the friction shoes and the casing being too great to permit inward movement of the clutch, which includes the wedge, until the spring cap D has been forced inwardly to the full extent of its movement and the cooperating follower of the draft rigging engages the rear end of the casing A. After the casing is engaged by the follower, the wedge is compelled to move inwardly, spreading the shoes apart and forcing the same inwardly along the friction surfaces of the friction shell section of the casing with resultant high frictional resistance.

When the actuating pressure is reduced, the parts are all returned to the normal full release position shown in Figure 3 by the expansive action of the spring resistance, outward movement of the wedge B being limited by the stop flange 15 of the casing being engaged by the shoulders 19—19 of the wedge, and outward movement of the spring cap being limited by the retainer element E which, in turn, has its outward movement limited by engagement of the lugs 33—33 thereof with the stop shoulders 13—13 of the casing.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a lengthwise extending casing having a friction shell section at one end; of a lengthwise movable spring cap telescoped within the other end of the casing; a retaining element for said spring cap, said retaining element having laterally projecting retaining lugs, and said casing having lengthwise extending slots closed at the rear end within which said lugs are engaged, the lugs of said retaining element clearing the interior side walls of the casing when the retaining element is tilted at an angle with respect to a transverse plane perpendicular to the longitudinal axis of the casing to permit insertion of the retaining element, said element when righted with the lugs transversely aligned with the slots having the lugs engaged in said slots; a friction clutch slidingly telescoped within the spring cage section of the casing; and spring means yieldingly opposing relative lengthwise inward movement of the clutch and spring cap.

2. In a friction shock absorber, the combination with a lengthwise extending casing having a friction shell section at one end and a spring cage section at the other end, said casing having diametrically opposite openings in the walls of the spring cage section thereof; of a lengthwise movable spring cap telescoped within the spring cage section of the casing; a retaining element for said cap, said retaining element having laterally projecting retaining lugs projecting outwardly beyond the inner surfaces of the side walls of the casing and engaged within the openings of said side walls, the lugs of said retaining element clearing the interior side walls of the casing when the retaining element is tilted at an angle with respect to a transverse plane perpendicular to the longitudinal axis of the casing to permit insertion of the retaining element, said element when righted with the lugs transversely aligned with the slots having the lugs engaged in said slots; a friction clutch slidingly telescoped within the friction section of the casing; and spring means yieldingly opposing relative lengthwise inward movement of the clutch and spring cap.

3. In a friction shock absorber, the combination with a lengthwise extending casing having a friction shell section at one end and a spring cage section at the other end, said casing having diametrically opposed openings in the side walls of the spring cage section thereof, said openings having stop shoulders at the rear ends thereof; of a retaining element on which said spring cap bears, said retaining element having laterally projecting lugs extending laterally outwardly beyond the inner surfaces of the side walls of the cage section and being engaged in said openings of the casing, and engageable with said stop shoulders to limit outward movement of said element, the lugs of said retaining element clearing the interior side walls of the casing when the retaining element is tilted at an angle with respect to a transverse plane perpendicular to the longitudinal axis of the casing to permit insertion of the retaining element, said element when righted with the lugs transversely aligned with the slots having the lugs engaged in said slots; a friction clutch slidingly telescoped within the spring cage section; and spring means yieldingly opposing relative lengthwise inward movement of the clutch and lengthwise inward movement of the spring cap and retaining element.

4. In a friction shock absorber, the combination with a lengthwise extending casing having a friction shell section at one end and a spring cage section at the other end, said casing having diametrically opposed openings in the side walls of the spring cage section thereof, said openings having stop shoulders at the rear ends thereof; of a U-shaped retaining element embracing said cap and on which the cap bears, said retaining element having laterally, outwardly projecting retaining lugs on the arms thereof engaged in said openings of the casing, and engageable with said stop shoulders to limit outward movement of said element, the lugs of said retaining element clearing the interior side walls of the casing when the retaining element is tilted at an angle with respect to a transverse plane perpendicular to the longitudinal axis of the casing to permit insertion of the retaining element, said element when righted with the lugs transversely aligned with the slots having the lugs engaged in said slots; a friction clutch slidingly telescoped within the spring cage section; and spring means yieldingly opposing relative lengthwise inward movement of the clutch and lengthwise inward movement of the spring cap.

GEORGE E. DATH.

REFERENCES CITED

The following references are of record in the file of this patent:

UNITED STATES PATENTS

| Number | Name | Date |
| --- | --- | --- |
| 1,747,238 | Gross | Feb. 18, 1930 |
| 1,852,567 | Hazeltine | Apr. 5, 1932 |
| 2,050,541 | Olander | Aug. 11, 1936 |
| 2,354,826 | Olander | Aug. 1, 1944 |
| 2,411,956 | Dath | Dec. 3, 1946 |